US006325290B1

(12) United States Patent
Walter et al.

(10) Patent No.: US 6,325,290 B1
(45) Date of Patent: Dec. 4, 2001

(54) METHOD AND APPARATUS FOR CHECKING OUT LARGE ITEMS WITH A SELF-SERVICE CHECKOUT TERMINAL

(75) Inventors: Joanne S. Walter, Alpharetta; Horng-Jaan Lin, Lawrenceville; Donald L. Forsythe, Dacula, all of GA (US)

(73) Assignee: NCR Corporation, Dayton, OH (US)

(*) Notice: Subject to any disclaimer, the term of this patent is extended or adjusted under 35 U.S.C. 154(b) by 0 days.

(21) Appl. No.: 09/205,962

(22) Filed: Dec. 4, 1998

(51) Int. Cl.⁷ ................................................ G06K 7/10
(52) U.S. Cl. .................. 235/472.01; 235/383; 235/385; 235/462.45; 235/462.14; 186/59; 186/61
(58) Field of Search .......................... 235/383, 385, 235/439, 462.48, 462.14, 462.01, 462.45; 186/59, 61; 307/112, 119, 125, 116; 361/1

(56) References Cited

U.S. PATENT DOCUMENTS

| | | | |
|---|---|---|---|
| D. 296,788 | 7/1988 | Schneider et al. ............... D14/116 |
| 3,735,350 | 5/1973 | Lemelson .................. 340/146.3 SY |
| 4,028,537 | 6/1977 | Snow .............................. 235/61.9 R |
| 4,084,742 | 4/1978 | Silverman ............................ 235/419 |
| 4,180,204 | 12/1979 | Koenig et al. ...................... 235/385 |
| 4,377,741 | 3/1983 | Brekka et al. ...................... 235/472 |
| 4,529,871 | 7/1985 | Davidson ............................ 235/383 |
| 4,574,317 | 3/1986 | Scheible ............................ 358/285 |
| 4,679,154 | * | 7/1987 | Blanford ............................ 235/383 |
| 4,734,713 | 3/1988 | Sato et al. ....................... 346/76 PH |
| 4,914,280 | 4/1990 | Peterson ............................ 235/472 |
| 5,004,916 | * | 4/1991 | Collins, Jr. ......................... 250/235 |
| 5,053,636 | * | 10/1991 | Zelina ................................ 307/112 |
| 5,079,412 | 1/1992 | Sugiyama ............................ 235/383 |
| 5,142,161 | 8/1992 | Brackmann .......................... 250/566 |
| 5,177,345 | 1/1993 | Baitz ................................. 235/462 |
| 5,189,291 | 2/1993 | Siemiatkowski ...................... 235/472 |
| 5,293,319 | 3/1994 | DeSha et al. ..................... 364/464.02 |
| 5,314,631 | 5/1994 | Katoh et al. ........................ 235/467 |
| 5,315,097 | * | 5/1994 | Collins, Jr. et al. ............. 235/462.25 |
| 5,343,025 | 8/1994 | Usui ................................... 235/383 |
| 5,406,063 | 4/1995 | Jelen ................................... 235/472 |
| 5,426,282 | 6/1995 | Humble ............................... 235/383 |
| 5,426,423 | 6/1995 | Raimbault et al. ............. 340/825.35 |
| 5,448,046 | 9/1995 | Swartz ................................ 235/432 |
| 5,457,307 | 10/1995 | Dumont .............................. 235/383 |
| 5,484,991 | 1/1996 | Sherman et al. ..................... 235/472 |
| 5,560,450 | * | 10/1996 | Kouno ................................... 186/61 |
| 5,747,784 | * | 5/1998 | Walter et al. ....................... 235/383 |
| 5,756,984 | * | 5/1998 | Kobayashi ....................... 235/462.45 |
| 5,900,614 | * | 5/1999 | Nakakawaji et al. ........... 235/462.14 |
| 5,914,473 | * | 6/1999 | Gresky ................................ 235/383 |
| 5,925,872 | * | 7/1999 | Wyatt et al. ..................... 235/472.01 |
| 5,978,772 | * | 11/1999 | Mold ..................................... 705/16 |
| 6,032,128 | * | 2/2000 | Morrision et al. ..................... 705/23 |
| 6,056,087 | * | 5/2000 | Addy et al. ............................ 186/61 |

FOREIGN PATENT DOCUMENTS

11328299 A * 11/1999 (JP).

* cited by examiner

Primary Examiner—Karl D. Frech
Assistant Examiner—Jamara A. Franklin
(74) Attorney, Agent, or Firm—Maginot, Addison & Moore

(57) ABSTRACT

A method of operating a self-service checkout terminal is herein. The self-service checkout terminal has a housing, a stationary scanner secured to the housing, and a hand-held scanner having a holder associated therewith. The hand-held scanner is movable relative to the housing. The method includes the step of detecting when the hand-held scanner is removed from the holder and generating a removed-from-holder control signal in response thereto. The method also includes the step of disabling the stationary scanner in response to generation of the removed-from-holder control signal. The method further includes the step of generating a first item-entered control signal when a first product code associated with a first item for purchase is read by the hand-held scanner. Moreover, the method includes the step of marking the first item for purchase so as to indicate that the first product code was read by the hand-held scanner.

21 Claims, 5 Drawing Sheets

METHOD AND APPARATUS FOR CHECKING OUT LARGE ITEMS WITH A SELF-SERVICE CHECKOUT TERMINAL

TECHNICAL FIELD OF THE INVENTION

The present invention relates generally to a retail checkout terminal, and more particularly to a method and apparatus for checking out large items with a self-service checkout terminal.

BACKGROUND OF THE INVENTION

In the retail industry, the largest expenditures are typically the cost of the goods sold followed closely by the cost of labor expended. With particular regard to the retail grocery or supermarket industry, the impetus to reduce labor costs has focused on reducing or eliminating the amount of time required to handle and/or process the items or goods to be purchased by a customer. To this end, there have been a number of self-service checkout terminal concepts developed which attempt to substantially eliminate the need for a checkout clerk.

A self-service checkout terminal is a system which is operated by a customer without the aid of a checkout clerk. In such a system, the customer scans individual items for purchase across a scanner and then places the scanned items into a grocery bag, if desired. The customer then pays for his or her purchases either at the self-service checkout terminal if so equipped, or at a central payment area which is staffed by a store employee. Thus, a self-service checkout terminal permits a customer to select, itemize, and in some cases pay for his or her purchases without the assistance of the retailer's personnel.

However, during operation of the self-service checkout terminal, the customer may desire to purchase an item which is difficult to scan with the stationary scanner typically included in the self-service checkout terminal. In particular, the customer's items for purchase may include items, such as a bag of dog food, which are relatively large, bulky, or otherwise have a size, weight, and/or shape which renders the item difficult to lift and thereafter scan over a stationary scanner. In such a situation, the customer is undesirably forced to either strain himself or herself in order to lift and scan the item, or request assistance by store personnel thereby reducing efficiency associated with the customer's operation of the self-service checkout terminal. Alternatively, the customer may be required to manually input a product code associated with the large, bulky item via a keypad or the like. However, the customer may be inexperienced in such manual entry of the product code thereby causing the customer to make mistakes in entering the item or completely preventing the customer from entering the item without the assistance of store personnel.

Moreover, the self-service checkout terminal may be equipped with a security device, such as a video system or a number of scales, which provide security during operation of the terminal by monitoring movement or placement of items subsequent to entry into the terminal. For example, the self-service checkout terminal may include a bag scale which detects placement of an item into a grocery bag once the item has been scanned into the terminal. However, use of such a bag scale is not effective in the case of large, bulky items since such large, bulky items will likely not be placed in a grocery bag.

What is needed therefore is a self-service checkout terminal which overcomes one or more of the above-mentioned drawbacks. What is particularly needed is a self-service checkout terminal which facilitates a customer's entry of large, bulky items. What is also needed is a self-service checkout terminal which provides a level of security for monitoring entry of such large, bulky items.

SUMMARY OF THE INVENTION

In accordance with a first embodiment of the present invention, there is provided a method of operating a self-service checkout terminal. The self-service checkout terminal has a housing, a stationary scanner secured to the housing, and a hand-held scanner having a holder associated therewith. The hand-held scanner is movable relative to the housing. The method includes the step of detecting when the hand-held scanner is removed from the holder and generating a removed-from-holder control signal in response thereto. The method also includes the step of disabling the stationary scanner in response to generation of the removed-from-holder control signal. The method further includes the step of generating a first item-entered control signal when a first product code associated with a first item for purchase is read by the hand-held scanner.

In accordance with a second embodiment of the present invention, there is provided a method of operating a self-service checkout terminal. The self-service checkout terminal has a housing, a stationary scanner secured to the housing, and a hand-held scanner having a holder associated therewith. The hand-held scanner is movable relative to the housing. The method includes the step of detecting when the hand-held scanner is removed from the holder and generating a removed-from-holder control signal in response thereto. The method also includes the step of disabling the stationary scanner in response to generation of the removed-from-holder control signal. The method further includes the step of generating a first item-entered control signal when a first product code associated with a first item for purchase is read by the hand-held scanner. Moreover, the method includes the step of marking the first product code so as to indicate that the first product code was read by the hand-held scanner.

In accordance with a third embodiment of the present invention, there is provided a self-service checkout terminal. The self-service checkout terminal includes a housing, a stationary scanner secured to the housing, and a hand-held scanner which is movable relative to the housing. The self-service checkout terminal also includes a processing unit electrically coupled to both the stationary scanner and the hand-held scanner. The self-service checkout terminal further includes a memory device electrically coupled to the processing unit. The memory device has stored therein a plurality of instructions which, when executed by the processing unit, causes the processing unit to disable the stationary scanner during use of the hand-held scanner and generate a first item-entered control signal when a first product code associated with a first item for purchase is read by the hand-held scanner.

It is a further object of the present invention to provide a new and useful method of operating a self-service checkout terminal.

It is also an object of the present invention to provide an improved method of operating a self-service checkout terminal.

It is therefore an object of the present invention to provide a new and useful self-service checkout terminal.

It is moreover an object of the present invention to provide an improved self-service checkout terminal.

It is yet another object of the present invention to provide a self-service checkout terminal which allows a customer to quickly and efficiently checkout items of varying shapes and sizes including relatively large items thereby facilitating use of the terminal by a customer.

It is also an object of the present invention to provide a self-service checkout terminal which provides a level of security against improprieties during the checking out of relatively large items which cannot be entered into the terminal via a stationary scanner.

The above and other objects, features, and advantages of the present invention will become apparent from the following description and the attached drawings.

DETAILED DESCRIPTION OF THE INVENTION

Figure 1:
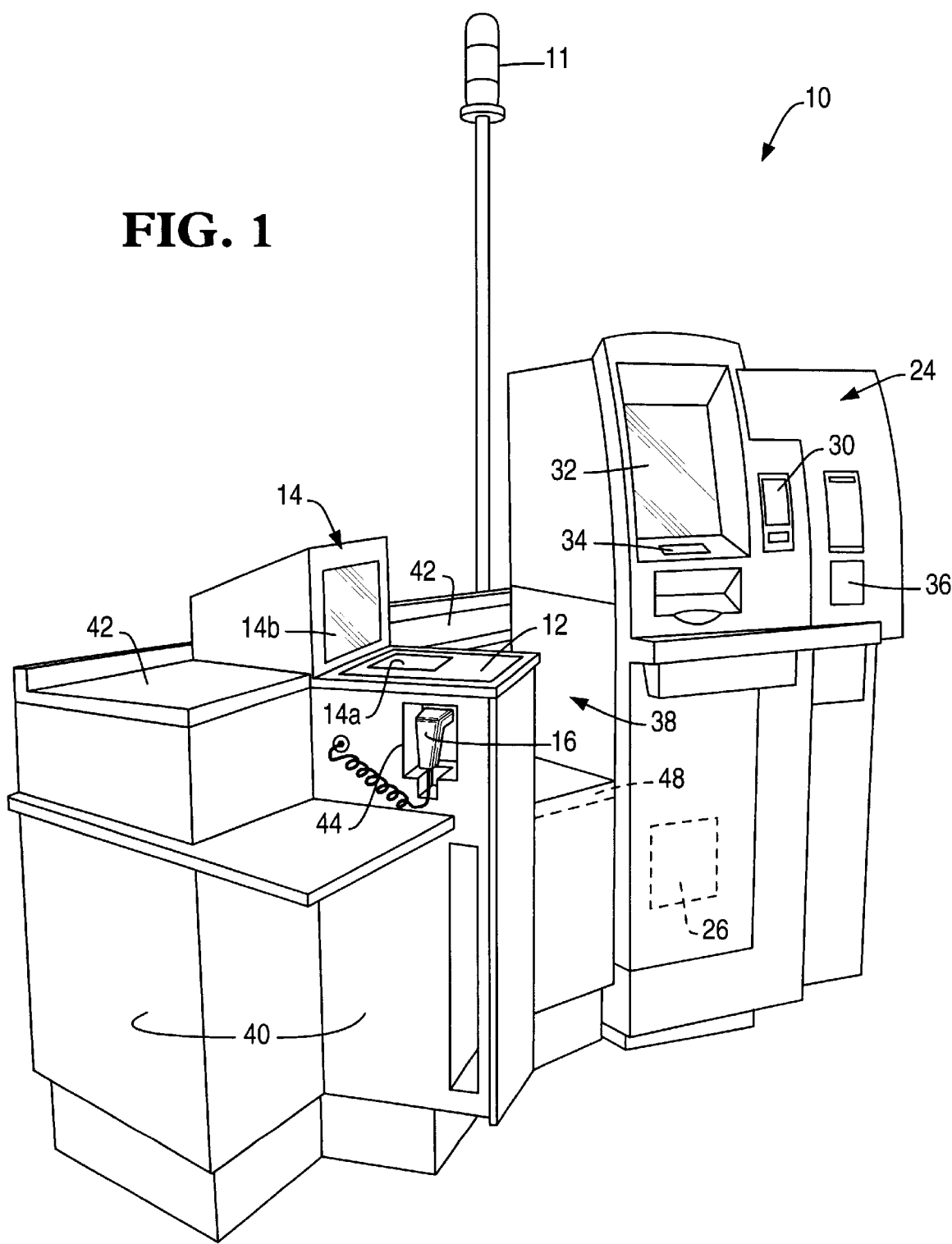
FIG.1 is a perspective view of a self-service checkout terminal which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Referring now to FIG. 1, there is shown a self-service checkout terminal 10 for use in a retail business such as a grocery store. The self-service checkout terminal 10 includes a status light device 11, a product scale 12, a stationary scanner 14, a hand-held scanner 16, a card reader 30, a display monitor 32, a keypad 34, a printer 36, and a processing unit 26. The card reader 30, the display monitor 32, the keypad 34, and the printer 36 may be provided as separate components, or alternatively may preferably be provided as components of an automated teller machine (ATM) 24.

The self-service checkout terminal 10 also includes a housing 40. The housing 40 has a bagwell 38 defined therein for accommodating one or more grocery bags (not shown). The bagwell 38 is configured to allow two or more grocery bags to be accessed by the customer at any given time thereby allowing a customer to selectively load various item types into the grocery bags. For example, the customer may desire to use a first grocery bag for household chemical items such as soap or bleach, and a second grocery bag for edible items such as meat and produce.

The stationary scanner 14 conventionally scans or reads a product identification code such as a Universal Product Code (UPC), industrial symbol(s), alphanumeric character (s), or other indicia associated with an item to be purchased. One scanner which may be used as the stationary scanner 14 of the present invention is a model number 7875 bi-optic scanner which is commercially available from NCR Corporation of Dayton, Ohio.

The stationary scanner 14 is secured to the housing 40. In particular, the stationary scanner 14 includes a first scanning window 14a and a second scanning window 14b. The first scanning window 14a is disposed within a top counter 42 of the housing 40 in a substantially horizontal manner, whereas the second scanning window 14b is disposed in a substantially vertical manner, as shown in FIG. 1. The product scale 12 is integrated with the stationary scanner 14. More specifically, the product scale 12 is disposed substantially parallel to the scanning window 14a thereby enveloping the scanning window 14a. If an item such as produce is placed upon the product scale 12 or the first scanning window 14a, the product scale 12 may be used to determine the weight of the item.

The stationary scanner 14 also includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the product identification code on an item is passed over the stationary scanner 14, the scanning light beams scatter off the code and are returned to the stationary scanner 14 where they are collected and detected. The reflected light is then analyzed electronically in order to determine whether the reflected light contains a valid product identification code pattern. If a valid code pattern is present, the product identification code is then converted into pricing information which is then used to determine the cost of the item in a known manner.

The hand-held scanner 16 is provided to facilitate occasions in which the customer desires to enter an item which is difficult to scan with the stationary scanner 14. In particular, the hand-held scanner 16 is provided to allow the customer to scan items which are relatively large, bulky, or otherwise possess a size, weight, and/or shape which renders the item difficult to lift and thereafter scan over a stationary scanner 14. Examples of such items include large bags of dog food or salt for water softeners, large cases of soda, or large house plants. It should be appreciated that the hand-held scanner 16 is operable to scan or otherwise read a product identification code such as a Universal Product Code (UPC), industrial symbol(s), alphanumeric character (s), or other indicia associated with an item to be purchased in a manner similar to as discussed above in regard to the stationary scanner 14.

The housing 40 also has a holder 44 defined therein. The holder 44 is provided to hold or otherwise secure the hand-held scanner 16 during nonuse thereof. What is meant herein by the term "nonuse" is a period of time in which the hand-held scanner 16 is not being operated to scan items for entry into the self-service checkout terminal 10. Conversely, as used herein in regard to the hand-held scanner 16, the term "use" is meant to mean a period of time in which the hand-held scanner 16 is being operated to scan items for entry into the self-service checkout terminal 10. Hence, if the customer desires to utilize the hand-held scanner 16 in order to scan a product identification code associated with a large, bulky item, the customer removes the hand-held scanner 16 from the holder 44 and scans the product identification code associated with the large, bulky item. Thereafter, the customer replaces the hand-held scanner 16 into the holder 44.

Figure 2:
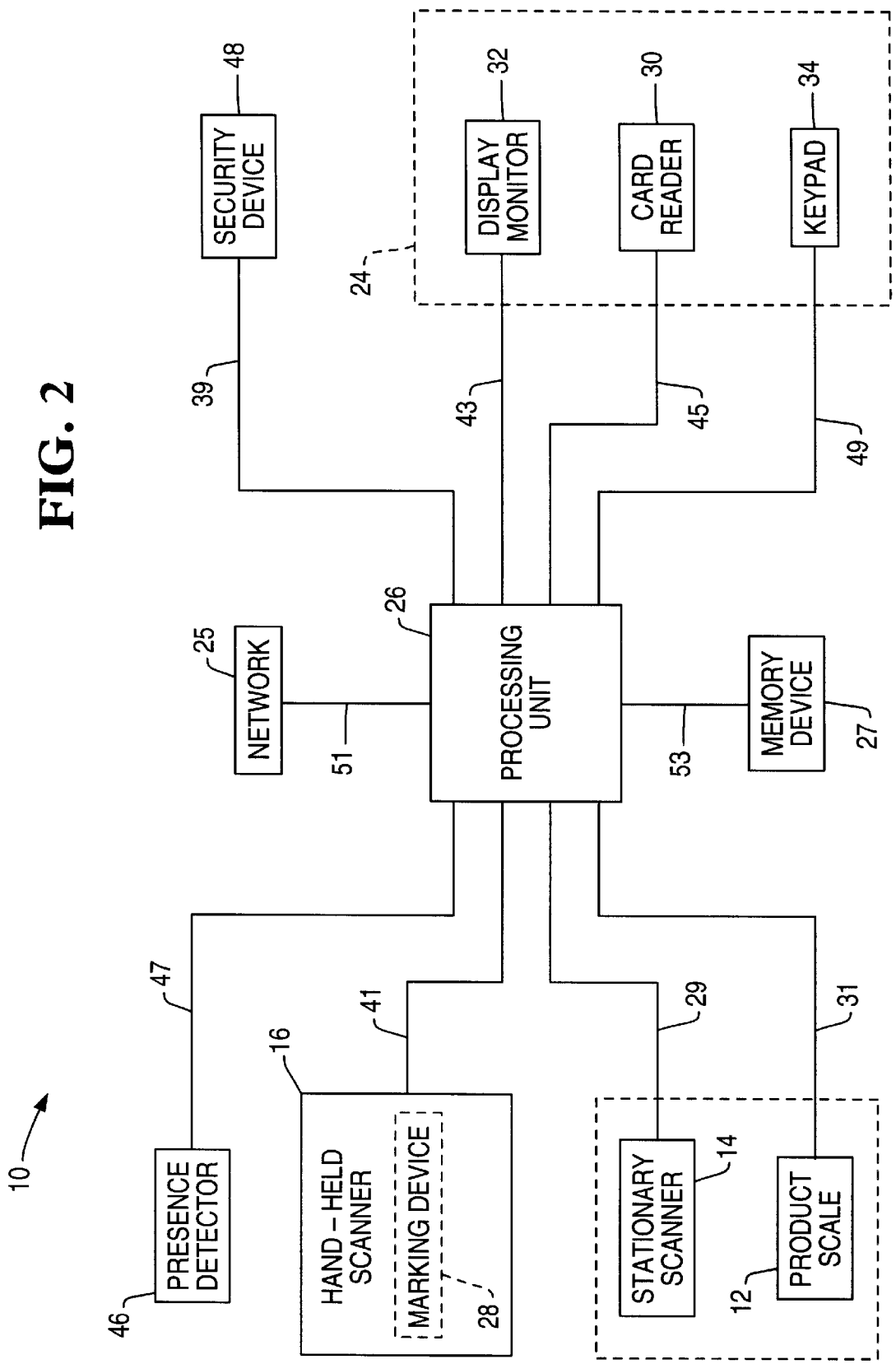
FIG. 2 is a simplified block diagram of the self-service checkout terminal of FIG. 1.

The holder 44 includes a presence detector 46 (see FIG. 2). The presence detector 46 detects presence of the hand-held scanner 16 within the holder 44. The presence detector 46 may be any known mechanical switch, proximity sensor, or other type of sensor which may be utilized to detect presence of the hand-held scanner 16 within the holder 44. As shall be discussed below in more detail, the presence detector 46 generates output signals indicative of presence (or lack of presence) of the hand-held scanner 16 within the holder 44 which are utilized by the processing unit 26 during operation of the self-service checkout terminal 10.

The hand-held scanner 16 has a marking device 28 associated therewith (see FIG. 2). The marking device 28 is provided to mark or otherwise designate items (e.g. large, bulky items) which have been properly entered into the self-service checkout terminal 10 via operation of the hand-held scanner 16. In particular, once the hand-held scanner 16 has read the product identification code of the item, the marking device 28 is operated so as to mark the item on or near the product identification code thereby indicating that the item has been properly entered. Various types of marking devices are contemplated for use as the marking device 28 of the present invention. For example, the marking device 28 may be embodied as an ink marking device which is integrated into the hand-held scanner 16 that applies an ink stamp on or near the product identification code of the item once the hand-held scanner 16 has read the product identification code. Moreover, the marking device 28 may be provided as a labeling device which is integrated into the hand-held scanner 16 that applies a label on or near the product identification code of the item once the hand-held scanner 16 has read the product identification code. Examples of hand-held scanners having marking devices which are suitable for use as the marking device 28 of the present invention are disclosed in U.S. Pat. No. 5,457,307 issued to Dumont, U.S. Pat. No. 5,488,046 issued to Swartz, U.S. Pat. No. 5,142,161 issued to Brackmann, and U.S. Pat. No. 4,180,204 issued to Koenig et al.

It should be appreciated that placing such a mark on the scanned item provides a level of security against theft and other improprieties. In particular, presence of the mark on the item (e.g. an ink marking or a label) allows store personnel to quickly and easily determine if the item has been scanned into the self-service checkout terminal 10. Moreover, presence of the mark serves as a psychological deterrent for a customer who might otherwise consider committing an intentional impropriety such as theft.

The self-service checkout terminal also includes a security device 48. The security device 48 provides security from improprieties, such as theft, during operation of the self-service checkout terminal 10. As shown in FIG. 1, the security device 48 may be a scale which monitors the weight of items placed in the bagwell 38 (i.e. into one of the grocery bags) or onto the portion of the counter 42 which is located proximate the bagwell 38. It should be appreciated that a customer may place an item onto the portion of the counter 42 proximate the bagwell 38 subsequent to entering the item, but prior to placing the item into a grocery bag. For example, if a customer scans a loaf of bread, the customer may want to place the bread onto the portion of the counter 42 proximate the bagwell 38 until one of the grocery bags is nearly full thereby preventing the bread from being crushed. Hence, the scale 48 may be utilized to monitor the ingress and egress of items into and out of the bagwell 38 along with onto and off of the counter 42. Such monitoring is particularly useful for preventing items which have not been scanned from being placed into a grocery bag.

The security device 48 may also be embodied as numerous other types of devices. For example, the security device 48 may be embodied as a video system which captures video images associated with movement or placement of items throughout the area proximate the self-service checkout terminal 10. Moreover, the security device 48 may be embodied as a light curtain device which is 'tripped' when items are placed into or removed from the bagwell 38 or placed onto or off of the counter 42.

The display monitor 32 displays instructions which serve to guide a customer through a checkout procedure. For example, an instruction is displayed on the display monitor 32 which instructs the customer to enter an item into the self-service checkout terminal 10 by either passing the item over the stationary scanner 14, or placing the item on the product scale 12 in order to obtain the weight of the item. In the case of where an item cannot readily be scanned with the stationary scanner 14, the display monitor 32 displays an instruction which instructs the customer to remove the hand-held scanner 16 from the holder 44 and scan the product identification code associated with the item with the hand-held scanner 16. The display monitor 32 is preferably a known touch screen monitor which can generate data signals when certain areas of the screen are touched by a customer.

The status light device 11 is provided in order to notify store personnel, such as a customer service manager, that intervention into the customer's transaction is needed. In particular, the status light device 11 may display a first colored light in order to notify store personnel that intervention is needed prior to the end of the customer's transaction. Alternatively, the status light device 11 may display a second colored light in order to notify store personnel that intervention is needed immediately.

Referring now to FIG. 2, there is shown a simplified block diagram of the self-service checkout terminal 10. The processing unit 26 is electrically coupled to the product scale 12, the stationary scanner 14, the hand-held scanner 16, the card reader 30, the display monitor 32, the keypad 34, the presence detector 46, and the security device 48. The processing unit 26 is also electrically coupled to a network 25 and a memory device 27.

The processing unit 26 monitors output signals generated by the stationary scanner 14 via a communication line 29. In particular, when the customer scans an item which includes a product identification code across the scanning windows 14*a*, 14*b*, an output signal indicative of the product identification code is generated on the communication line 29.

The processing unit 26 is coupled to the product scale 12 via a data communication line 31. In particular, when an item is placed thereon, the product scale 12 generates an output signal on the data communication line 31 indicative of the weight of the item.

The processing unit 26 communicates with the hand-held scanner 16 via a communication line 41. In particular, when the customer scans an item which includes a product identification code with the hand-held scanner 16 (e.g. a large, bulky item), an output signal indicative of the product identification code is generated on the communication line 41.

The processing unit 26 is electrically coupled to the presence detector 46 via a signal line 47. As alluded to above, the presence detector 46 generates a first of output signal on the signal line 47 when the hand-held scanner 16 is removed from the holder 44. Moreover, the presence detector 46 generates a second output signal on the signal line 47 when the hand-held scanner 16 is replaced in the holder 44.

The processing unit 26 communicates with the display monitor 32 through a data communication line 43. The processing unit 26 generates output signals on the data communication line 43 which cause various instructional messages to be displayed on the display monitor 32. The display monitor 32 may include known touch screen technology which can generate output signals when the customer touches a particular area of the display screen associated with the display monitor 32. The signals generated by the display monitor 32 are transmitted to the processing unit 26 via the data communication line 43.

The security device 48 is coupled to the processing unit 26 through a data communication line 39. Hence, when the security device 48 detects a security event (e.g. a weight increase on a scale or an interruption of a light curtain), the security device 48 communicates data indicative of the security event on the data communication line 39.

The keypad 34 is coupled to the processing unit 26 through a data communication line 49. The keypad 34 may include one or more of a known keypad or a touch pad. Moreover, the card reader 30 is coupled to the processing unit 26 through a data communication line 45. The card reader 30 may include a known credit, debit, loyalty, and/or smart card reader.

The processing unit 26 includes network interface circuitry (not shown) which conventionally permits the self-service checkout terminal 10 to communicate with the network 25 such as a LAN or WAN through a wired connection 51. The processing unit 26 communicates with the network 25 during the checkout procedure in order to obtain information such as pricing information associated with an item being scanned or otherwise entered, and also to verify customer credit approval when appropriate. The network interface circuitry associated with the self-service checkout terminal 10 may include a known Ethernet expansion card, and the wired connection 51 may include a known twisted-pair communication line. Alternatively, the network interface circuitry may support wireless communications with the network 25.

The processing unit 26 communicates with the memory device 27 via a data communication line 53. The memory device 27 is provided to maintain a number of databases associated with operation of the self-service checkout terminal 10. For example, the memory device maintains an electronic transaction table which includes a record of the product information associated with each item that is scanned, weighed, or otherwise entered during the customer's operation of the self-service checkout terminal 10. For example, if the customer scans a can of soup, the description of the soup and the pricing information associated therewith is recorded in the transaction table in the memory device 27. Similarly, if the customer weighs a watermelon with the product scale 12 and then enters a product lookup code associated with watermelon via the keypad 34, product information associated with the watermelon is recorded in the transaction table. Moreover, if a customer enters a coupon or voucher, the information associated therewith would also be recorded in the transaction table.

It should therefore be appreciated that the sum of each of the items recorded in the transaction table (1) minus any reductions (e.g. coupons), and (2) plus any applicable taxes is the amount that the customer pays for his or her transaction. Moreover, data stored in the transaction table is printed out on the printer 36 (see FIG. 1) thereby generating a receipt for the customer at the end of his or her transaction.

In operation, the processing unit 26 controls the various components associated with the self-service checkout terminal 10 in order to facilitate a customer's operation of the terminal. For example, as shall be discussed below in more detail, during use of the hand-held scanner 16, the processing unit 26 disables the stationary scanner 14 so as to prevent entry of items therewith. In particular, when a customer removes the hand-held scanner 16 from the holder 44, the presence detector generates an output signal which is sent to the processing unit 26. In response, the processing unit 26 disables the stationary scanner 14 in order to prevent inadvertent scans or mis-scans by the stationary scanner 14.

Moreover, as described above, the security device 48 monitors placement and/or movement of items in the area proximate the self-service checkout terminal 10. However, when a customer utilizes the hand-held scanner 16 to scan an item (e.g. a large, bulky item), it is likely that the customer will not place the item in a location which is monitored by the security device 48 (e.g. the bagwell 48 or the portion of the counter 42 proximate the bagwell 38). Hence, in order to prevent "false alarms" or other types of improper detection, the security device 48 may also be disabled by the processing unit 26 during period of use of the hand-held scanner 16. What is meant herein by the terms "disable", "disables", "disabling", or "disabled" is that output signals from a device associated with the self-service checkout terminal 10 (e.g. the stationary scanner 14 or the security device 48) are not utilized or otherwise processed by the processing unit 26 for their intended purpose. Conversely, what is meant herein by the terms "enable", "enables", or "enabling" is that output signals from a device associated with the self-service checkout terminal 10 (e.g. the stationary scanner 14 or the security device 48) are utilized or otherwise processed by the processing unit 26 for their intended purpose.

It should be appreciated that a device may be disabled in a number of different manners. For example, the processing unit 26 may communicate with the device in order to render the device inoperable, or may alternatively allow the device to operate normally, but ignore input therefrom. For instance, in the case of the stationary scanner 14, the processing unit 26 may disable the stationary scanner 14 by communicating with the stationary scanner 14 so as to prevent the scanner 14 from attempting to scan product identification codes (i.e. preventing light signals from being generated by the scanner 14), or may alternatively allow the stationary scanner 14 to operate normally, but ignore any output signals generated by the scanner 14. Similarly, in the case of the security device 48, the processing unit 26 may disable the security device 48 by communicating with the security device 48 so as to prevent the security device 48 from monitoring movement or placement of items (e.g. not collecting weight values in the case of a weight scale or not generating a light curtain in the case of the light curtain device), or may alternatively allow the security device 48 to operate normally, but ignore any output signals generated by the security device 48.

Figure 3:
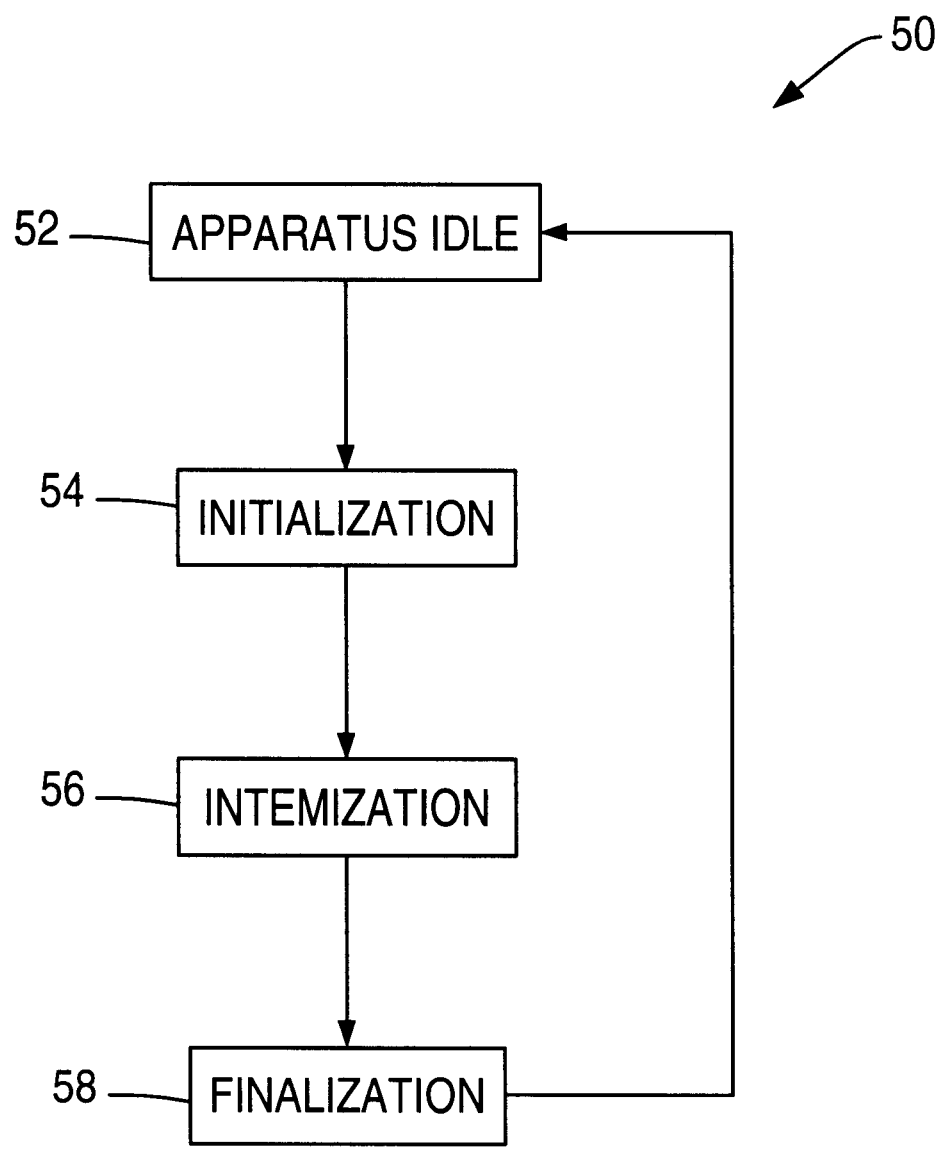
FIG. 3 is a flowchart setting forth a general procedure for checking out items through the self-service checkout terminal of FIG. 1; and FIG. 4A

Referring now to FIG. 3, there is shown a flowchart which sets forth a general procedure 50 for checking out items through the self-service checkout terminal 10. It should be appreciated that when the customer arrives at the self-service checkout terminal 10, the terminal 10 is in an idle state (step 52). An initialization step 54 is executed prior to checking out items for purchase. In particular, one or more initialization instructions are displayed on the display monitor 32 which instruct the customer to (1) touch a particular area of the display monitor 32 or push a particular button on the keypad 34 in order to select a desired method of payment, and/or (2) identify himself or herself by inserting a loyalty card, debit card, credit card, or smart card into the card reader 30.

At the completion of the initialization step 54, the routine 50 advances to an itemization step 56 where the customer enters individual items for purchase by scanning the items across the stationary scanner 14. Moreover, in step 56 the customer enters items, such as large, bulky items, by removing the hand-held scanner 16 from the holder 44 and scanning the item therewith. Yet further in step 56, the customer may enter items, such as produce items or the like, by weighing the items with the product scale 12, and thereafter entering a product lookup code associated with the item via either the keypad 34 or by touching a particular area of the display monitor 32. Further, in step 56 the customer may enter an item by manually entering the product identification code associated with the item via use of the keypad 34. Such manual entry of an item may be necessary for items which would otherwise be entered via the stationary scanner 14 or the hand-held scanner 16 if the product identification code printed on the item is not readable by the stationary scanner 14 or the hand-held scanner 16. It should be appreciated that the self-service checkout terminal 10 may be configured such that the routine 50 allows experienced customers of the self-service checkout terminal 10 to bypass the initialization step 52 thereby advancing directly to the itemization step 56. In such a configuration, the experienced customer would begin the transaction by scanning or otherwise entering his or her first item for purchase.

At the completion of the itemization step 56, the routine 50 advances to a finalization step 58 in which (1) a grocery receipt is printed by the printer 36, and (2) payment is tendered by either inserting currency into a cash acceptor (not shown), charging a credit card or debit card account, or decreasing a value amount stored on a smart card via the card reader 30. It should be appreciated that in the case of when a customer inserts currency into the cash acceptor, the self-service checkout terminal 10 may provide change via a currency dispenser (not shown) and a coin dispenser (not shown). After completion of the finalization step 58, the routine 50 returns to step 52 in which the self-service checkout terminal 10 remains in the idle condition until a subsequent customer initiates a checkout procedure.

Figure 4A:
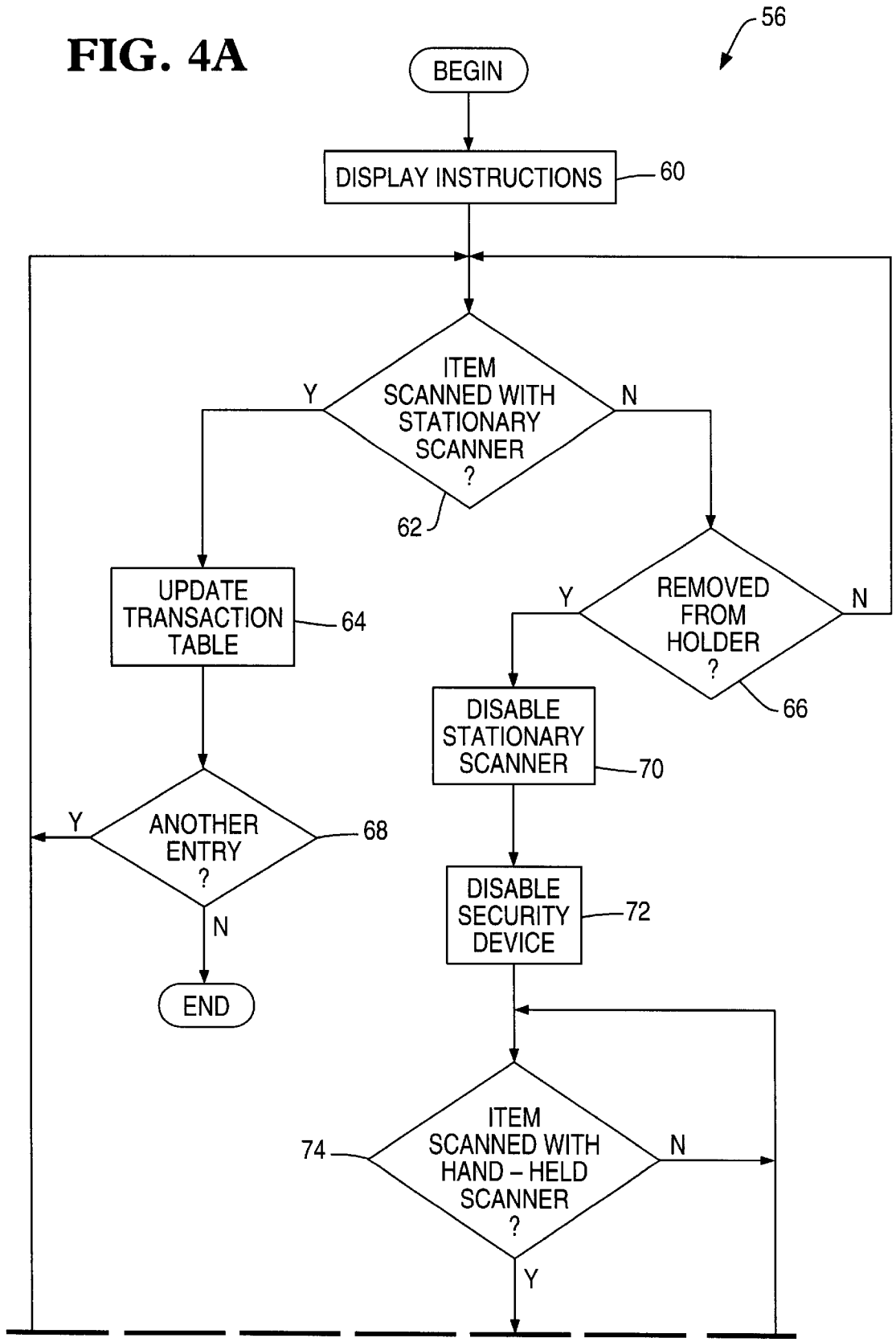
FIG. 4B is a flowchart setting forth in more detail the itemization step of the general procedure of FIG. 3.
Figure 4B:
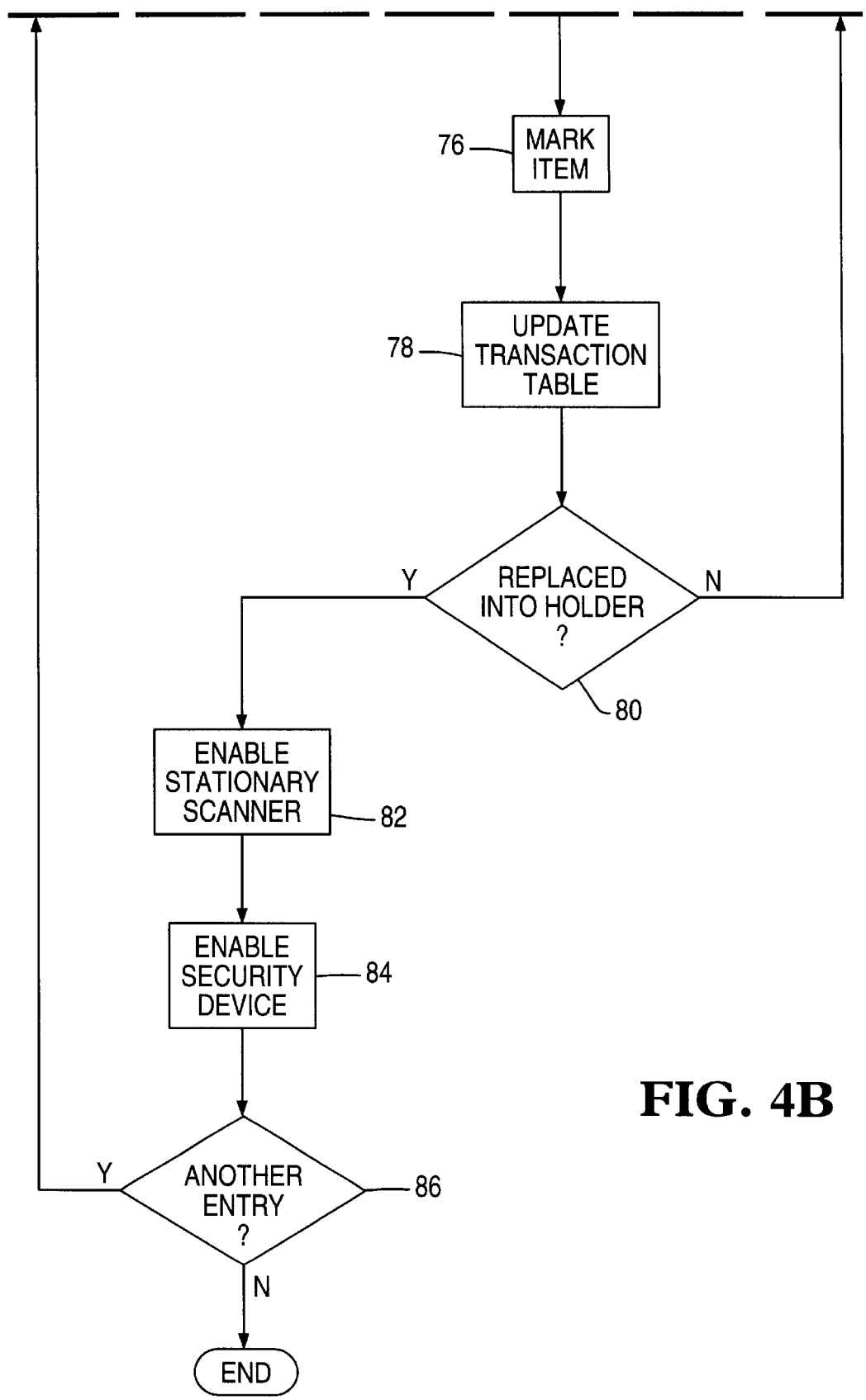

Referring now to FIG. 4, there is shown a flowchart setting forth the itemization step 56 in greater detail. After the initialization step 54 (see FIG. 3) is completed, the routine 56 advances to step 60 in which a message is displayed on the display monitor 32 which instructs the customer to enter an item by either (1) passing or otherwise scanning individual items across or adjacent the stationary scanner 14 with the item's product identification code facing the scanning windows 14a, 14b, (2) removing the hand-held scanner 16 from the holder 44 in order to scan the item with the hand-held scanner 16, (3) placing an individual item on the product scale 12 in order to be weighed, or (4) manually entering the product identification code associated with an item with the keypad 34. The routine 56 then advances to step 62.

In step 62, the processing unit 26 determines whether an item has been entered into the self-service checkout terminal 10 by use of the stationary scanner 14. In particular, the processing unit 26 determines if the stationary scanner 14 has successfully read or otherwise captured the product identification code associated with an item. More specifically, the stationary scanner 14 generates an output signal which is sent to the processing unit 26 once the stationary scanner 14 successfully reads the product identification code associated with the item. If an item is successfully entered into the self-service checkout terminal 10 by the stationary scanner 14, an item-entered control signal is generated and the routine 56 advances to step 64. If an item is not successfully entered into the self-service checkout terminal 10 by the stationary scanner 14, the routine 56 advances to step 66.

In step 64, the processing unit 26 adds a record of the item entered in step 62 to the transaction table. In particular, the processing unit 26 communicates with the network 25 to obtain product information (e.g. description and price) associated with the entered item from a master product database. Thereafter, the processing unit 26 updates the transaction table. More specifically, the processing unit 26 generates an output signal which causes the transaction table to be updated to include the product information associated with the entered item. It should be appreciated that the contents of the transaction table are used by the self-service checkout terminal 10 for purposes of generating a grocery bill and receipt at the end of the transaction. The routine 56 then advances to step 68.

In step 68, the processing unit 26 monitors output from the keypad 34 and the display monitor 32 in order to determine whether there are more items to be entered. In particular, a message is displayed on the display monitor 32 instructing the customer to touch a particular touch screen area of the display monitor 32, or to touch a particular key associated with the keypad 34, when the customer has completed entering all of his or her items for purchase.

If a particular output is detected from either the keypad 34 or the display monitor 32, the processing unit 26 determines that the itemization step 56 is complete and the routine 56 then ends thereby advancing the routine 50 (see FIG. 3) to the finalization step 58 in order to allow the customer to tender payment for his or her items for purchase. If a particular output is not detected from either the keypad 34 or the display monitor 32, the processing unit 26 determines that the customer has additional items for purchase to be entered, and the routine 56 loops back to step 62 to monitor entry of subsequent items.

Returning now to step 62, if an item is not successfully entered into the self-service checkout terminal 10 by the stationary scanner 14, the routine 56 advances to step 66. In step 66, the processing unit 26 determines if the customer has removed the hand-held scanner 16 from the holder 44. In particular, the processing unit 26 scans or reads the signal line 47 to determine if the presence detector 46 has detected removal of the hand-held scanner 16 from the holder 44. If the customer removes the hand-held scanner 16 from the holder 44, a removed-from-holder control signal is generated and the routine 56 advances to step 70. If the customer does not remove the hand-held scanner 16 from the holder 44, the routine 56 loops back to step 62 to monitor entry of subsequent items.

In step 70, the processing unit 26 disables the stationary scanner 14. As described above, the stationary scanner 14 may be disabled in a number of different manners. For example, the processing unit 26 may disable the stationary scanner 14 by communicating with the stationary scanner 14 so as to prevent the scanner 14 from attempting to scan additional product identification codes (i.e. preventing light signals from being generated by the scanner 14). Alternatively, the processing unit 26 may allow the stationary scanner 14 to operate normally, but ignore any output signals generated by the scanner 14. Once the stationary scanner 14 has been disabled, the routine 56 advances to step 72.

In step 72, the processing unit 26 disables the security device 48. As described above, the security device 48 may be disabled in a number of different manners. For example, the processing unit 26 may disable the security device 48 by communicating with the security device 48 so as to prevent the security device 48 from monitoring movement or placement of items (e.g. not collecting weight values in the case of a weight scale or not generating a light curtain in the case of a light curtain device). Alternatively, the processing unit 26 may allow the security device 48 to operate normally, but ignore any output signals generated by the security device 48. Once the security device 48 has been disabled, the routine 56 advances to step 74.

In step 74, the processing unit 26 determines whether an item has been entered into the self-service checkout terminal 10 by use of the hand-held scanner 16. In particular, the processing unit 26 determines if the hand-held scanner 16 has successfully read or otherwise captured the product identification code associated with an item. More specifically, the hand-held scanner 16 generates an output signal which is sent to the processing unit 26 once the hand-held scanner 16 successfully reads the product identification code associated with the item. If an item is successfully entered into the self-service checkout terminal 10 by the hand-held scanner 16, an item-entered control signal is generated and the routine 56 advances to step 76. If an item is not successfully entered into the self-service checkout terminal 10 by the hand-held scanner 16, the routine 56 loops back to monitor entry of subsequent items.

In step 76, the marking device 28 associated with the hand-held scanner 16 marks the item scanned in step 74. In particular, once the hand-held scanner 16 has read the product identification code associated with the item, the marking device 28 is operated so as to mark the item on or near the product identification code thereby indicating that the item has been properly entered. For example, in the case of when the marking device 28 is embodied as an ink marking device that is integrated into the hand-held scanner 16, the marking device 28 applies an ink stamp on or near the product identification code of the item once the hand-held scanner 16 has read the code. Moreover, in the case of when the marking device 28 is provided as a labeling device that is integrated into the hand-held scanner 16, the marking device 28 applies a label on or near the product identification code of the item once the hand-held scanner 16 has read the code. Once the marking device has marked the item, the routine 56 advances to step 78.

In step 78, the processing unit 26 adds a record of the item entered in step 74 to the transaction table. In particular, the processing unit 26 communicates with the network 25 to obtain product information (e.g. description and price) associated with the entered item from a master product database. Thereafter, the processing unit 26 updates the transaction table. More specifically, the processing unit 26 generates an output signal which causes the transaction table to be updated to include the product information associated with the entered item. It should be appreciated that the contents of the transaction table are used by the self-service checkout terminal 10 for purposes of generating a grocery bill and receipt at the end of the transaction. The routine 56 then advances to step 80.

In step 80, the processing unit 26 determines if the customer has replaced the hand-held scanner 16 into the holder 44. In particular, the processing unit 26 scans or reads the signal line 47 to determine if the presence detector 46 has detected replacement of the hand-held scanner 16 into the holder 44. If the customer replaces the hand-held scanner 16 into the holder 44, a replaced-in-holder control signal is generated and the routine 56 advances to step 82. If the customer does not replace the hand-held scanner 16 into the holder 44, the routine 56 loops back to step 74 to monitor entry of subsequent items via the hand-held scanner 16.

In step 82, the processing unit 26 enables the stationary scanner 14. In particular, the processing unit 26 communicates with the stationary scanner 14 in order to enable the stationary scanner 14 thereby allowing the stationary scanner 14 to scan subsequent product identification codes and generate output signals on the signal line 29 indicative of the same. Once the stationary scanner 14 has been enabled, the routine 56 advances to step 84.

In step 84, the processing unit 26 enables the security device 48. In particular, the processing unit 26 communicates with the security device 48 in order to enable the security device 48 thereby allowing the security device 48 to monitor movement and placement of items and generate output signals on the signal line 39 indicative of the same. Once the security device 48 has been enabled, the routine 56 advances to step 86.

In step 86, the processing unit 26 monitors output from the keypad 34 and the display monitor 32 in order to determine whether there are more items to be entered. In particular, a message is displayed on the display monitor 32 instructing the customer to touch a particular touch screen area of the display monitor 32, or to touch a particular key associated with the keypad 34, when the customer has completed entering all of his or her items for purchase.

If a particular output is detected from either the keypad 34 or the display monitor 32, the processing unit 26 determines that the itemization step 56 is complete and the routine 56 then ends thereby advancing the routine 50 (see FIG. 3) to the finalization step 58 in order to allow the customer to tender payment for his or her items for purchase. If a particular output is not detected from either the keypad 34 or the display monitor 32, the processing unit 26 determines that the customer has additional items for purchase to be entered, and the routine 56 loops back to step 62 to monitor entry of subsequent items.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

For example, although the holder 44 is described herein as being defined in the housing 40, the holder 44 may be any type of mechanism for holding the hand-held scanner 16 during periods of nonuse thereof. For instance, the holder 44 may be embodied as a small receptacle device that is positioned on the counter 42.

Moreover, although the retail terminal of the present invention has herein been described as being a self-service checkout terminal, and has significant advantages thereby in the present invention, it should be appreciated that other types of retail terminals are contemplated for use in the present invention. For example, the retail terminal may be an assisted retail terminal which is operated by a clerk or other employee of the retailer.

What is claimed is:

1. A method of operating a self-service checkout terminal having (i) a housing, (ii) a stationary scanner secured to said housing, and (iii) a hand-held scanner having a holder associated therewith, said hand-held scanner being movable relative to said housing, comprising the steps of:

detecting when said hand-held scanner is removed from said holder and generating a removed-from-holder control signal in response thereto;

disabling said stationary scanner in response to generation of said removed-from-holder control signal; and generating a first item-entered control signal when a first product code associated with a first item for purchase is read by said hand-held scanner.

2. The method of claim 1, further comprising the step of:
entering a first record corresponding to said first item for purchase in a transaction table in response to generation of said first item-entered control signal.

3. The method of claim 2, further comprising the steps of:
detecting when said hand-held scanner is replaced into said holder and generating a replaced-in-holder control signal in response thereto;
enabling said stationary scanner in response to generation of said replaced-in-holder control signal; and
generating a second item-entered control signal when a second product code associated with a second item for purchase is read by said stationary scanner.

4. The method of claim 3, further comprising the step of:
entering a second record corresponding to said second item for purchase in said transaction table in response to generation of said second item-entered control signal.

5. The method of claim 1, wherein said self-service checkout terminal further has a security device for providing security during operation of said terminal, further comprising the step of:
disabling said security device in response to generation of said removed-from-holder control signal.

6. The method of claim 1, further comprising the step of:
marking said first item for purchase so as to indicate that said first product code was read by said hand-held scanner.

7. The method of claim 6, wherein:
said marking step includes the step of applying ink to said first product code.

8. The method of claim 6, wherein:
said marking step includes the step of placing a label on said first product code.

9. A method of operating a self-service checkout terminal having (i) a housing, (ii) a stationary scanner secured to said housing, and (iii) a hand-held scanner having a holder associated therewith, said hand-held scanner being movable relative to said housing, comprising the steps of:
detecting when said hand-held scanner is removed from said holder and generating a removed-from-holder control signal in response thereto;
disabling said stationary scanner in response to generation of said removed-from-holder control signal;
generating a first item-entered control signal when a first product code associated with a first item for purchase is read by said hand-held scanner; and
marking said first item for purchase so as to indicate that said first product code was read by said hand-held scanner.

10. The method of claim 9, further comprising the step of:
entering a first record corresponding to said first item for purchase in a transaction table in response to generation of said first item-entered control signal.

11. The method of claim 10, further comprising the steps of:
detecting when said hand-held scanner is replaced into said holder and generating a replaced-in-holder control signal in response thereto;
enabling said stationary scanner in response to generation of said replaced-in-holder control signal; and
generating a second item-entered control signal when a second product code associated with a second item for purchase is read by said stationary scanner.

12. The method of claim 11, further comprising the step of:
entering a second record corresponding to said second item for purchase in said transaction table in response to generation of said second item-entered control signal.

13. The method of claim 9, wherein said self-service checkout terminal further has a security device for providing security during operation of said terminal, further comprising the step of:
disabling said security device in response to generation of said removed-from-holder control signal.

14. A self-service checkout terminal, comprising:
a housing;
a stationary scanner secured to said housing;
a hand-held scanner which is movable relative to said housing;
a processing unit electrically coupled to both said stationary scanner and said hand-held scanner; and
a memory device electrically coupled to said processing unit, wherein said memory device has stored therein a plurality of instructions which, when executed by said processing unit, causes said processing unit to:
(i) disable said stationary scanner during use of said hand-held scanner, and
(ii) generate a first item-entered control signal when a first product code associated with a first item for purchase is read by said hand-held scanner.

15. The self-service checkout terminal of claim 14, wherein said plurality of instructions, when executed by said processing unit, further causes said processing unit to enter a first record corresponding to said first item for purchase in a transaction table in response to generation of said first item-entered control signal.

16. The self-service checkout terminal of claim 15, wherein said plurality of instructions, when executed by said processing unit, further causes said processing unit to:
(i) enable said stationary scanner during nonuse of said hand-held scanner, and
(ii) generate a second item-entered control signal when a second product code associated with a second item for purchase is read by said stationary scanner.

17. The self-service checkout terminal of claim 16, wherein said plurality of instructions, when executed by said processing unit, further causes said processing unit to enter a second record corresponding to said second item for purchase in said transaction table in response to generation of said second item-entered control signal.

18. The self-service checkout terminal of claim 14, further comprising:
a security device for providing security during operation of said terminal,
wherein said plurality of instructions, when executed by said processing unit, further causes said processing unit to disable said security device during use of said hand-held scanner.

19. The self-service checkout terminal of claim 14, further comprising:
a marking device secured to said hand-held scanner, said marking device being configured to mark said first item for purchase so as to indicate that said first product code was read by said hand-held scanner.

20. The self-service checkout terminal of claim 19, wherein:
said marking device includes an ink marking device for applying ink to said first product code.

21. The self-service checkout device of claim 19, wherein:
said marking device includes a labeling device for placing a label on said first product code.

* * * * *